US011012518B2

(12) United States Patent
Deng et al.

(10) Patent No.: US 11,012,518 B2
(45) Date of Patent: May 18, 2021

(54) SYSTEMS AND METHODS FOR MANAGING NETWORKED COMMUNICATION SESSIONS

(71) Applicant: Beijing DiDi Infinity Technology and Development Co., Ltd., Beijing (CN)

(72) Inventors: Shengyong Deng, Fremont, CA (US); Liwei Ren, San Jose, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 82 days.

(21) Appl. No.: 16/227,180

(22) Filed: Dec. 20, 2018

(65) Prior Publication Data

US 2020/0204630 A1 Jun. 25, 2020

(51) Int. Cl.
*G06F 15/16* (2006.01)
*H04L 29/08* (2006.01)

(52) U.S. Cl.
CPC ............ *H04L 67/141* (2013.01); *H04L 67/28* (2013.01); *H04L 67/02* (2013.01)

(58) Field of Classification Search
CPC ....... H04L 67/02; H04L 67/141; H04L 67/28; H04L 29/06095; H04L 61/00; H04L 63/00; H04L 67/146; H04L 67/2814; H04L 67/2823; H04L 67/289; G06F 16/00; G06F 9/00
See application file for complete search history.

(56) References Cited

U.S. PATENT DOCUMENTS

| | | | |
|---|---|---|---|
| 2005/0021762 A1* | 1/2005 | Gbadegesin | ...... H04L 29/12009 709/227 |
| 2012/0158978 A1 | 6/2012 | Narayana et al. | |
| 2013/0128892 A1 | 5/2013 | Rao et al. | |
| 2013/0318339 A1 | 11/2013 | Tola et al. | |
| 2017/0339107 A1 | 11/2017 | Crawford | |

OTHER PUBLICATIONS

PCT International Search Report and the Written Opinion dated Mar. 29, 2019, issued in related International Application No. PCT/US2018/066746 (9 pages).

* cited by examiner

*Primary Examiner* — Ryan J Jakovac
(74) *Attorney, Agent, or Firm* — Sheppard Mullin Richter & Hampton LLP

(57) ABSTRACT

Systems and methods for managing networked communication sessions are described herein. A processor may obtain, by a driver running in a first operating mode of the one or more processors, session information and content information from a client application to be communicated to an external entity over a network. The processor may redirect, by the driver, the session information and the content information to a local proxy running in a second operating mode of the one or more processors via a local listening port of the local proxy. The redirecting may comprise modifying the session information to generate modified session information. The processor may obtain, at the local proxy, the modified session information and the content information. The processor may establish a communication channel between the local proxy and the external entity by modifying the modified session information to communicate the content information to the external entity.

12 Claims, 6 Drawing Sheets

SYSTEMS AND METHODS FOR MANAGING NETWORKED COMMUNICATION SESSIONS

TECHNICAL FIELD

The disclosure relates generally to managing networked communication sessions.

BACKGROUND

There are many products and technologies in the field of information security that perform a deep packet inspection (DPI) for local network traffic monitoring and filtering. Those products and technologies include anti-virus software, intrusion prevention systems (IPS), data leak prevention (DLP), and others. To be able to perform DPI, one needs a mechanism to intercept packets. There are multiple interception techniques available depending on the target for inspection. For example, if the target is a browser that generates packets, the interception usually can be done with a browser extension, an API hooking, a network filter driver in kernel mode, or other mechanisms.

In modern operating systems, there is a distinction between code that is running in "user mode", and code that is running in "kernel mode". Kernel mode has full access to resources. It is the mode in which the operating system kernel runs. The kernel refers to the core of a computer's operating system, with complete control over the system. The user mode has restricted access to resources. Processes started by the operating system (with the exception of the System "processes") run in user mode. In user mode, programs cannot modify paging directly and so have no way of accessing other programs' memory except through API or similar functions. Programs in user mode also cannot interfere with interrupts and context switching. A local proxy is an application residing in the user mode. A local proxy is an Internet-facing proxy used to retrieve data from a wide range of sources (in most cases anywhere on the Internet).

When passing information between the user mode and kernel mode, the local proxy may obtain multiple packets from multiple sessions via a user mode and kernel mode I/O API, where the local proxy performs DPI on those packets. The local proxy then demultiplexes the packets to each session which have different remote server addresses. Meanwhile, when the local proxy receives replies from multiple remote servers, the local proxy then multiplexes those replies into a user/kernel I/O to send down to the kernel mode. When the kernel mode receives the replies, it demultiplexes the packets to different sessions originated from a browser, and feeds corresponding reply packets back to the sessions. Network session mapping is also conducted. A network session may be defined by the 4-tuple elements: source IP, source port, destination IP, and destination port, in addition to the packet content. Accordingly, there cannot be two different sessions that have exactly the same source IP, source port, destination IP, and destination port. The 4-tuple elements are the identifier of a session, and are attach to the packet when the packet is moved from one place to another. Inbound or outbound packets for a session can be mapped through this 4-tuple. A session table is created to manage total active sessions in both kernel mode and the local proxy.

SUMMARY

One or more implementations of the systems and methods relate to managing networked communication sessions without multiplexing, demultiplexing, and the need for session table. One or more techniques presented herein may configure the local proxy to obtain and process packet content from kernel mode. These technique(s) may make it easier to manage and implement local proxy functions without multiplexing. These technique(s) may also achieve less overhead for the local proxy to process packet content. One or more of the techniques may be carried out through manipulation of information stored in the 4-tuple elements of a network session.

One aspect of the present disclosure is directed to a method for managing networked communication sessions. The method may comprise: obtaining, by a driver running in a first operating mode of the one or more processors, information from a client application to be communicated to an external entity over a network, the information including session information and content information, the content information defining content of the communication between the client application and the external entity, the session information including a set of parameter values of a set of session parameters; redirecting, by the driver, the session information and the content information to a local proxy running in a second operating mode of the one or more processors via a local listening port of the local proxy, the redirecting comprising modifying the session information to generate modified session information; obtaining, at the local proxy, the modified session information and the content information; and establishing a communication channel between the local proxy and the external entity by modifying the modified session information to communicate the content information to the external entity.

Another aspect of the present disclosure is directed to a method for managing networked communication sessions. The method may comprise: obtaining, by a local proxy running in a first operating mode of the one or more processors, information from a external entity to be communicated to a client application over a network, the information including session information and content information, the content information defining content of the communication between the external entity and the client application, the session information including a set of parameter values of a set of session parameters; redirecting, by the local proxy, the session information and the content information to a driver running in a second operating mode of the one or more processors via a local listening port of the local proxy, the redirecting comprising modifying the session information to generate modified session information; obtaining, at the driver, the modified session information and the content information; and communicating the content information to the client application by modifying the modified session information.

Another aspect of the present disclosure is directed to a system for managing networked communication sessions. The system may comprise one or more processors and a memory storing instructions. The instructions, when executed by the one or more processors, may cause the system to perform: obtaining, by a driver running in a first operating mode of the one or more processors, information from a client application to be communicated to an external entity over a network, the information including session information and content information, the content information defining content of the communication between the client application and the external entity, the session information including a set of parameter values of a set of session parameters; redirecting, by the driver, the session information and the content information to a local proxy running in a second operating mode of the one or more processors via a local listening port of the local proxy, the redirecting comprising modifying the session information to generate modified session information; obtaining, at the local proxy, the modified session information and the content information; and establishing a communication channel between the local proxy and the external entity by modifying the modified session information to communicate the content information to the external entity.

In some embodiments, the set of session parameters include a source IP parameter, a source port parameter, a destination IP parameter, and a destination port parameter. The set of parameter values include: a local IP address value for the source IP parameter, a local port value of the client application for the source port parameter, an external entity IP address value for the destination IP parameter, and an HTTP port value for the destination port parameter.

In some embodiments, modifying the session information to generate the modified session information comprises: replacing the external entity IP address value with the local IP address value so that the local IP address value is the value of the destination IP parameter within the modified session information; replacing the HTTP port value with a listening port value of the local proxy so that the listening port value is the value of the destination port parameter within the modified session information; replacing the local IP address value of the source IP parameter with the external entity IP address value so that the external entity IP address value is the value of the source IP parameter within the modified session information; and maintaining the local port value of the client application for the source port parameter within the modified session information.

In some embodiments, redirecting the session information and the content information to the local listening port of the local proxy comprises communicating, via the local listening port of the local proxy, the modified session information and the content information from the driver to the local proxy.

In some embodiments, modifying, at the local proxy, the modified session information generates external session information. The modifying comprises: replacing the listening port value of destination port parameter within the modified session information with the HTTP port value so that the HTTP port value is the value of the destination port parameter within the external session information; replacing the local IP address value of the destination IP parameter within the modified session information with the external entity IP address value so that the external entity IP address value is the value of the destination IP parameter within the external session information; replacing the local port value of the client application of the source port parameter within the modified session information with a local proxy external session client socket port value so that the local proxy external session client socket port value is the value of the source port parameter within the external session information; and replacing the external entity IP address value of the source IP parameter within the modified session information with the local IP address value so that the local IP address value is the value of the source IP parameter within the external session information.

In some embodiments, the communication channel between the local proxy and the external entity may be established via the external session information.

Another aspect of the present disclosure is directed to a system for managing networked communication sessions. The system may comprise one or more processors and a memory storing instructions. The instructions, when executed by the one or more processors, may cause the system to perform: obtaining, by a local proxy running in a first operating mode of the one or more processors, information from a external entity to be communicated to a client application over a network, the information including session information and content information, the content information defining content of the communication between the external entity and the client application, the session information including a set of parameter values of a set of session parameters; redirecting, by the local proxy, the session information and the content information to a driver running in a second operating mode of the one or more processors via a local listening port of the local proxy, the redirecting comprising modifying the session information to generate modified session information; obtaining, at the driver, the modified session information and the content information; and communicating the content information to the client application by modifying the modified session information In some embodiments, the set of session parameters include a source IP parameter, a source port parameter, a destination IP parameter, and a destination port parameter, and the set of parameter values include: an external entity IP address value for the source IP parameter, a HTTP port value for the source port parameter, a local IP address value for the destination IP parameter, and a local proxy external session client socket port value for the destination port parameter.

In some embodiments, modifying the session information to generate modified session information comprises: replacing the local proxy external session client socket port value with a local port value of the client application so that the local port value of the client application is the value of the destination port parameter within the modified session information; replacing the local IP address value with the external entity IP address value so that the external entity IP address value is the value of the destination IP parameter within the modified session information; replacing the HTTP port value with a local listening port value of the local proxy so that the local listening port value is the value of the source port parameter within the modified session information; and replacing the external entity IP address value of the source IP parameter with a local IP address value so that the local IP address value is the value of the source IP parameter within the modified session information.

In some embodiments, modifying the modified session information generates internal session information. The modifying comprising: replacing the external entity IP address value of the destination IP parameter within the modified session information with the local IP address value so that the local IP address value is the value of the destination IP parameter within the internal session information; replacing the local listening port value of the source port parameter within the modified session information with the HTTP port value so that the HTTP port value is the value of the source port parameter within the internal session information; and replacing the local IP address value of the source IP parameter within the modified session information with the external entity IP address value so that the external entity IP address value is the value of the source IP parameter within the internal session information.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which.

DETAILED DESCRIPTION

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

The approaches disclosed herein improve functioning of computing systems that manage networked communication sessions. One or more techniques presented herein may configure the local proxy to obtain and process packet content from kernel mode. These technique(s) may make it easier to manage and implement local proxy functions without multiplexing to provide a faster, more efficient, connection between a client application and an external entity. These technique(s) may also achieve less overhead (e.g., more efficiency) for the local proxy to process packet content. One or more of the techniques may be carried out through manipulation of information stored in the 4-tuple elements of a network session.

Figure 1:
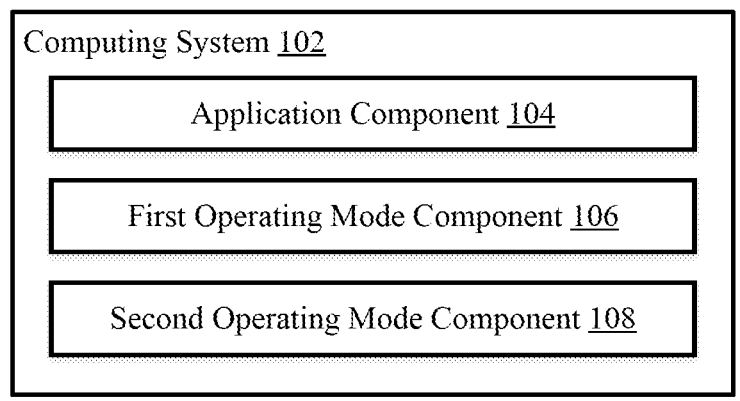
FIG. 1 illustrates an example environment for managing networked communication sessions, in accordance with various embodiments of the disclosure.

FIG. 1 illustrates an example system 100 for managing networked communication sessions, in accordance with various embodiments. The example system 100 may include a computing system 102 and/or other components. The computing system 102 may include one or more processors and memory (e.g., permanent memory, temporary memory). The processor(s) may be configured to perform various operations by interpreting machine-readable instructions stored in the memory. The computing system 102 may include other computing resources. The computing system 102 may have access (e.g., via one or more connections, via one or more networks) to other computing resources and/or other entities participating in the system 100.

The computing system 102 may include one or a combination of an application component 104, a first operating mode component 106, a second operating mode component 108, or other components. While the computing system 102 is shown in FIG. 1 as a single entity, this is merely for ease of reference and is not meant to be limiting. One or more components or one or more functionalities of the computing system 102 described herein may be implemented in a single computing device or multiple computing devices. In some embodiments, one or more components or one or more functionalities of the computing system 102 described herein may be implemented in one or more networks, one or more endpoints, one or more servers, or one or more clouds.

The application component 104 may run a client application. A client application may comprise a software program configured to provide features and/or functionality within the computing system 102. By way of non-limiting illustration, a client application may facilitate obtaining information over a network, such as the Internet, sending information over a network, or other functionality. A client application may include, for example, a web browser, a File Transfer Protocol (FTP) client, an email client, a Telnet client, a Dynamic Host Configuration Protocol (DHCP) client, or other client application. The client application may communicate with an external entity (e.g., an entity external to computing system 102) over a network session. By way of non-limiting illustration, an external entity may include a remote server, such as a web server. Running the client application may generate session information, content information, or a combination of session information and content information. The content information may define content of the communication between the client application and the external entity. The content information or a combination of the content information and the session information may be referred to as a "packet." The session information may include a set of parameter values of a set of session parameters. The set of session parameters may comprise the 4-tuple elements. The 4-tuple elements may be an identifier of a session, and are attached to the content information when the content is moved from one place to another. Inbound or outbound packets for a session may be mapped through this 4-tuple. For example, the set of session parameters may include one or a combination of a source IP parameter, a source port parameter, a destination IP parameter, or a destination port parameter.

When a communication is outgoing (e.g., from client application to external entity), the set of parameter values may include one or a combination of a local IP address value for the source IP parameter, a local port value of the client application for the source port parameter, an external entity IP address value for the destination IP parameter, and an HTTP port value for the destination port parameter. The local IP address value may comprise an Internet protocol (IP) address of computing system 102. The local port value of the client application may include a client socket port of the client application. By way of non-limiting illustration, for a web browser, the local port value of the client application may comprise the browser's client socket port. The external entity IP address value may comprise an IP address of the external entity (e.g., the remote server IP address). The HTTP port value may comprise the port number for Hypertext Transfer Protocol (HTTP), for example, HTTP Port 80.

The content information may define content of the communication between the client application and the external entity. When the communication is outgoing, the content may include one or a combination of information input into the client application, commands, requests for information, or other content. For example, for an email client, content information may include one or a combination of the email header, body of an email, attachment, or other content. For example, for a browser, content information may include one or a combination of HTTP commands, headers, attributes, messages, hyper-links, or other content.

The first operating mode component 106 may be configured to manage a first operating mode of computing system 102. The first operating mode may comprise a kernel mode. The kernel mode may run a kernel driver for packet interception. The kernel driver may be a network filter driver in kernel mode. A driver may comprise computer program that operates or controls a particular type of device or program that may be attached to, or included in computing system 102.

The first operating mode component 106 may obtain, by the kernel driver running in the first operating mode, information from a client application (e.g., ran by application component 104) to be communicated to an external entity over a network. The information may include session information, content information, or a combination of session information and content information. The session information may include session information for an outgoing communication, as described above.

The first operating mode component 106 may redirect, by the kernel driver, the session information, the content information, or a combination of the session information and the content information to a local proxy running in a second operating mode of the computer system 102. The second operating mode may comprise a user mode. The redirecting may be performed via a local listening port of the local proxy. The redirecting may comprise modifying the session information to generate modified session information. A port may refer to an endpoint of communication. The listening port may include a port of the local proxy which may be otherwise unused.

In some embodiments, modifying the session information to generate the modified session information comprises one or a combination of: replacing the external entity IP address value of the destination IP parameter with the local IP address value so that the local IP address value is the value of the destination IP parameter within the modified session information; replacing the HTTP port value of the destination port parameter with a listening port value of the local proxy so that the listening port value is the value of the destination port parameter within the modified session information; replacing the local IP address value of the source IP parameter with the external entity IP address value so that the external entity IP address value is the value of the source IP parameter within the modified session information; and maintaining the local port value of the client application for the source port parameter within the modified session information. By replacing these values, a packet can now be redirected to the local proxy via the listening port of the proxy. These techniques enable the system to avoid buffering/multiplexing/demultiplexing/session mapping and to provide a faster, more efficient, connection between a client application and an external entity. These technique(s) may also achieve less overhead (e.g., more efficiency) for the local proxy to process packet content. The local proxy may perform DPI on the packets it receives.

In some embodiments, redirecting the session information, the content information, or a combination of the session information and content information to the local listening port of the local proxy comprises communicating, via the local listening port of the local proxy, the modified session information and the content information from the driver to the local proxy.

The second operating mode component 108 may manage the second operating mode of computing system 102. The second operating mode may comprise the user mode. The user mode may run the local proxy.

The second operating mode component 108 may obtain, at the local proxy, the modified session information, the content information, or a combination of the modified session information and the content information redirected by the kernel driver.

The second operating mode component 108 may establish a communication channel between the local proxy and the external entity in order to communicate the packet to the external entity. The communication channel may be established over a network, such as the Internet. In some embodiments, the communication channel may be established by modifying the modified session information in order to communicate the content information to the external entity, since the modified session information does not properly identify the external entity.

In some embodiments, modifying, at the local proxy, the modified session information generates external session information. Generating the external session information may comprise one or a combination of: replacing the listening port value of destination port parameter within the modified session information with the HTTP port value so that the HTTP port value is the value of the destination port parameter within the external session information; replacing the local IP address value of the destination IP parameter within the modified session information with the external entity IP address value so that the external entity IP address value is the value of the destination IP parameter within the external session information; replacing the local port value of the client application of the source port parameter within the modified session information with a local proxy external session client socket port value so that the local proxy external session client socket port value is the value of the source port parameter within the external session information; or replacing the external entity IP address value of the source IP parameter within the modified session information with the local IP address value so that the local IP address value is the value of the source IP parameter within the external session information. The local proxy external session client socket port value may represent the local proxy's external session client socket port, which may be generated when the local proxy connects to the external entity to form the external session. Accordingly, the external session information may include one or a combination of the local IP address value for the source IP parameter, the local proxy external session client socket port value for the source port parameter, the external entity IP address value for the destination IP parameter, or the HTTP port value for the destination port parameter.

Once the external session information is generated, the communication channel between the local proxy and the external entity may be established and the content information may be communicated to the external entity.

When a communication is incoming (e.g., from external entity to the computing system 102), the set of parameter values may include one or a combination of the external entity IP address value for the source IP parameter, the HTTP port value for the source port parameter, the local IP address value of the computing system 102 for the destination IP parameter, or a local proxy external session client socket port value for the destination port parameter.

For the incoming communication, the second operating mode component 108 may obtain, via the local proxy running in the second operating mode (e.g., user mode) of the computer system 102, information from an external entity to be communicated to the client application over a network. The information may include session information, content information, or a combination of session information and content information. The content information may define content of the communication, in the form of a packet, between the external entity and the client application. The content of the communication for an incoming communication may include one or a combination of information requested by the client application, Internet content, or other information. The session information may include the set of parameter values for incoming communications, described above.

The second operating mode component 108 may redirect, by the local proxy, the session information, the content information, or a combination of the session information and content information to the kernel driver running in the first operating mode of the computing system 102 via the local listening port of the local proxy. The redirecting may comprise modifying the session information to generate modified session information.

In some implementations, for an incoming communication, modifying the session information to generate modified session information may comprise one or a combination of: replacing the local proxy external session client socket port value of the destination port parameter with a local port value of the client application so that the local port value of the client application is the value of the destination port parameter within the modified session information; replacing the local IP address value of the destination IP parameter with the external entity IP address value so that the external entity IP address value is the value of the destination IP parameter within the modified session information; replacing the HTTP port value of the source port parameter with a local listening port value of the local proxy so that the local listening port value is the value of the source port parameter within the modified session information; or replacing the external entity IP address value of the source IP parameter with a local IP address value so that the local IP address value is the value of the source IP parameter within the modified session information. Accordingly, the modified session information may include one or a combination of the local port value of the client application for the destination port parameter, the external entity IP address value for the destination IP parameter, the local listening port value for the source port parameter, or the local IP address value for the source IP parameter. This modified session information may cause the packet to be redirected to the kernel driver.

For the incoming communication, the first operating mode component 106 may obtain, at the kernel driver, the modified session information, the content information, or a combination of the modified session information and the content information from the local proxy.

The first operating mode component 106 may communicate the content information to the client application by modifying the modified session information in order to direct the content information to the client application.

In some embodiments, modifying the modified session information generates internal session information. Generating the internal session information may comprise one or a combination of: replacing the external entity IP address value of the destination IP parameter within the modified session information with the local IP address value so that the local IP address value is the value of the destination IP parameter within the internal session information; replacing the local listening port value of the source port parameter within the modified session information with the HTTP port value so that the HTTP port value is the value of the source port parameter within the internal session information; replacing the local IP address value of the source IP parameter within the modified session information with the external entity IP address value so that the external entity IP address value is the value of the source IP parameter within the internal session information; or maintaining the local port value of the client application for the destination port parameter. Accordingly, the internal session information may include one or a combination of the local IP address value for the destination IP parameter, the HTTP port value for the source port parameter, the external entity IP address value for the source IP parameter, or the local port value of the client application for the destination port parameter.

Figure 2:
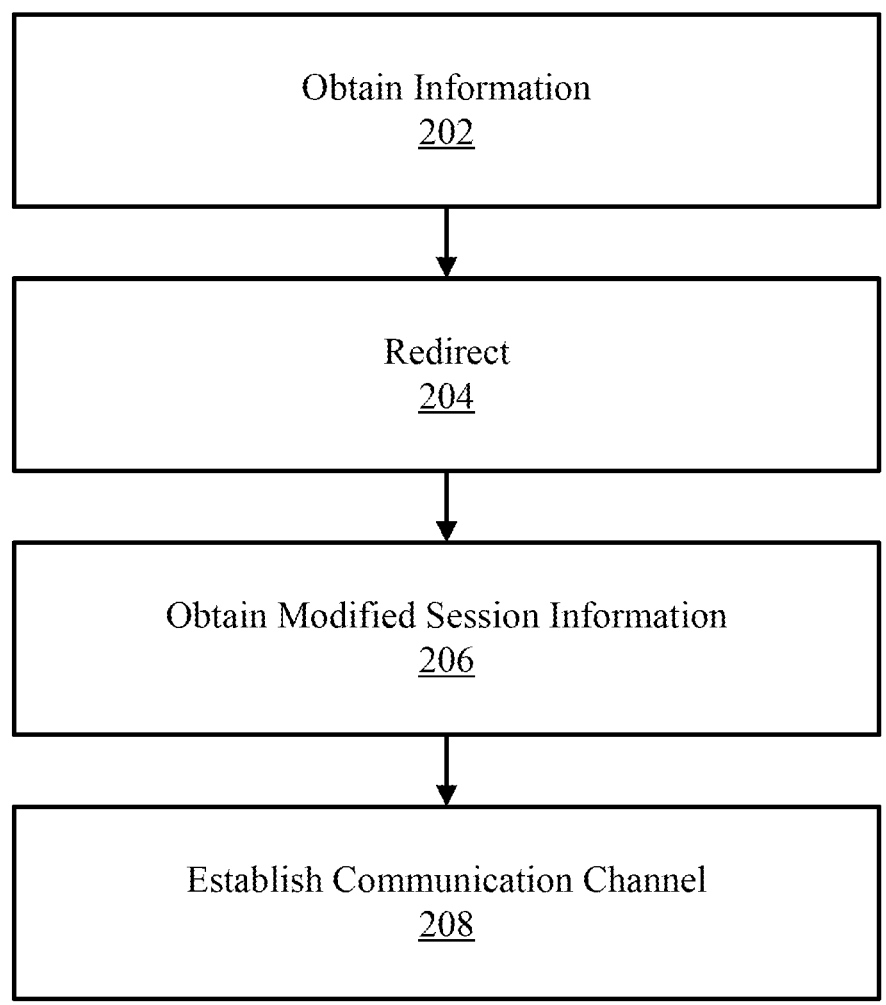
FIG. 2 illustrates an example flow chart of managing networked communication sessions, in accordance with various embodiments of the disclosure.

FIG. 2 illustrates an example flow chart 200 for managing networked communication sessions, in accordance with various embodiments of the disclosure. In particular, flow chart 200 may be for managing an outbound communication within a networked communication session. At block 202, a driver running in a first operating mode of a computing system may obtain information from a client application to be communicated to an external entity over a network. The information may include session information, content information, or a combination of session information and content information. The content information may define content of the communication between the client application and the external entity. The session information may include a set of parameter values of a set of session parameters. At block 204, the driver may redirect the session information, the content information, or a combination of the session information and content information to a local proxy running in a second operating mode of the computing system via a local listening port of the local proxy. The redirecting may comprise modifying the session information to generate modified session information. At a block 206, the local proxy may obtain the modified session information, the content information, or a combination of the modified session information and the content information. At a block 208, the local proxy may establish a communication channel between the local proxy and the external entity by modifying the modified session information in order to communicate the content information to the external entity.

Figure 3:
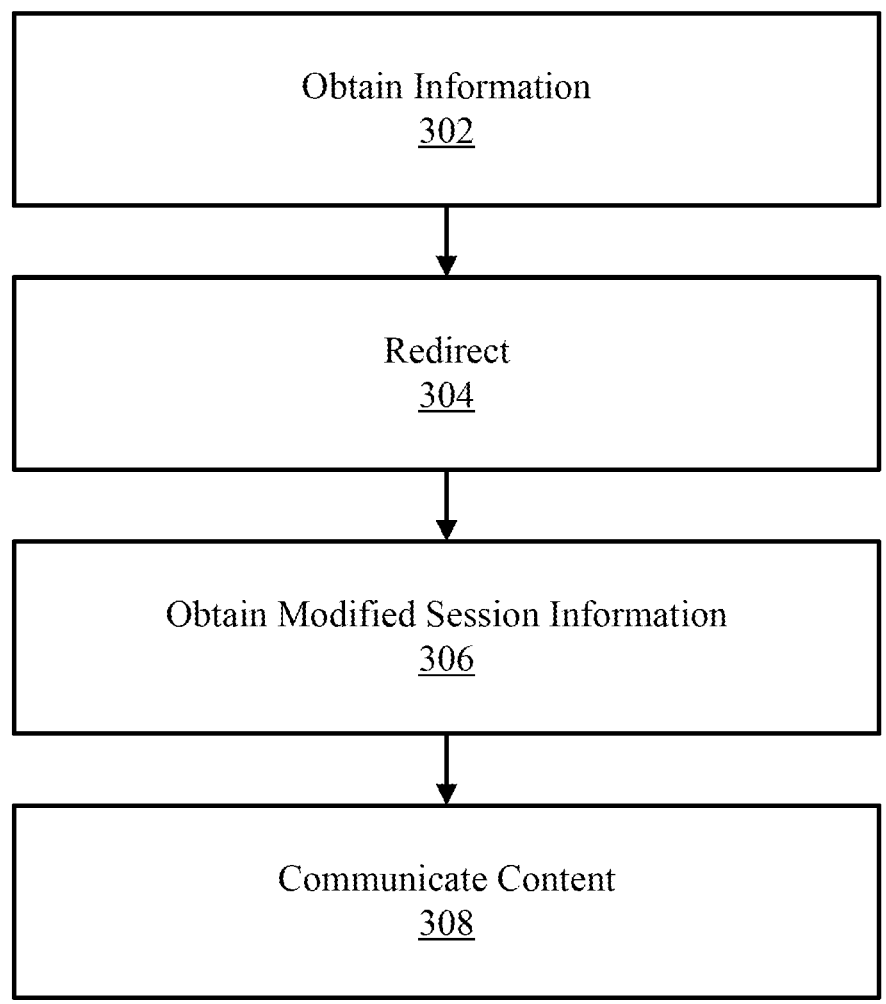
FIG. 3 illustrates an example flow chart of managing networked communication sessions, in accordance with various embodiments of the disclosure

FIG. 3 illustrates an example flow chart 300 for managing networked communication sessions, in accordance with various embodiments of the disclosure. In particular, flow chart 300 may be for managing an inbound communication within a networked communication session. At block 302, a local proxy running in the second operating mode (e.g., user mode) of the computing system may obtain information from the external entity to be communicated to the client application over a network. The information including session information, content information, or a combination of session information and the content information. The content information may define inbound content of the communication between the external entity and the client application. The session information may include a set of parameter values of a set of session parameters. At block 304, the local proxy may redirect the session information, the content information, or a combination of the session information and the content information to the driver running in a first operating mode of the computing system via a local listening port of the local proxy. The redirecting may comprise modifying the session information to generate modified session information. At block 306, the driver may obtain the modified session information, the content information, or a combination of the modified session information and the content information. At block 308, the driver may communicate the content information to the client application by modifying the modified session information.

Figure 4:
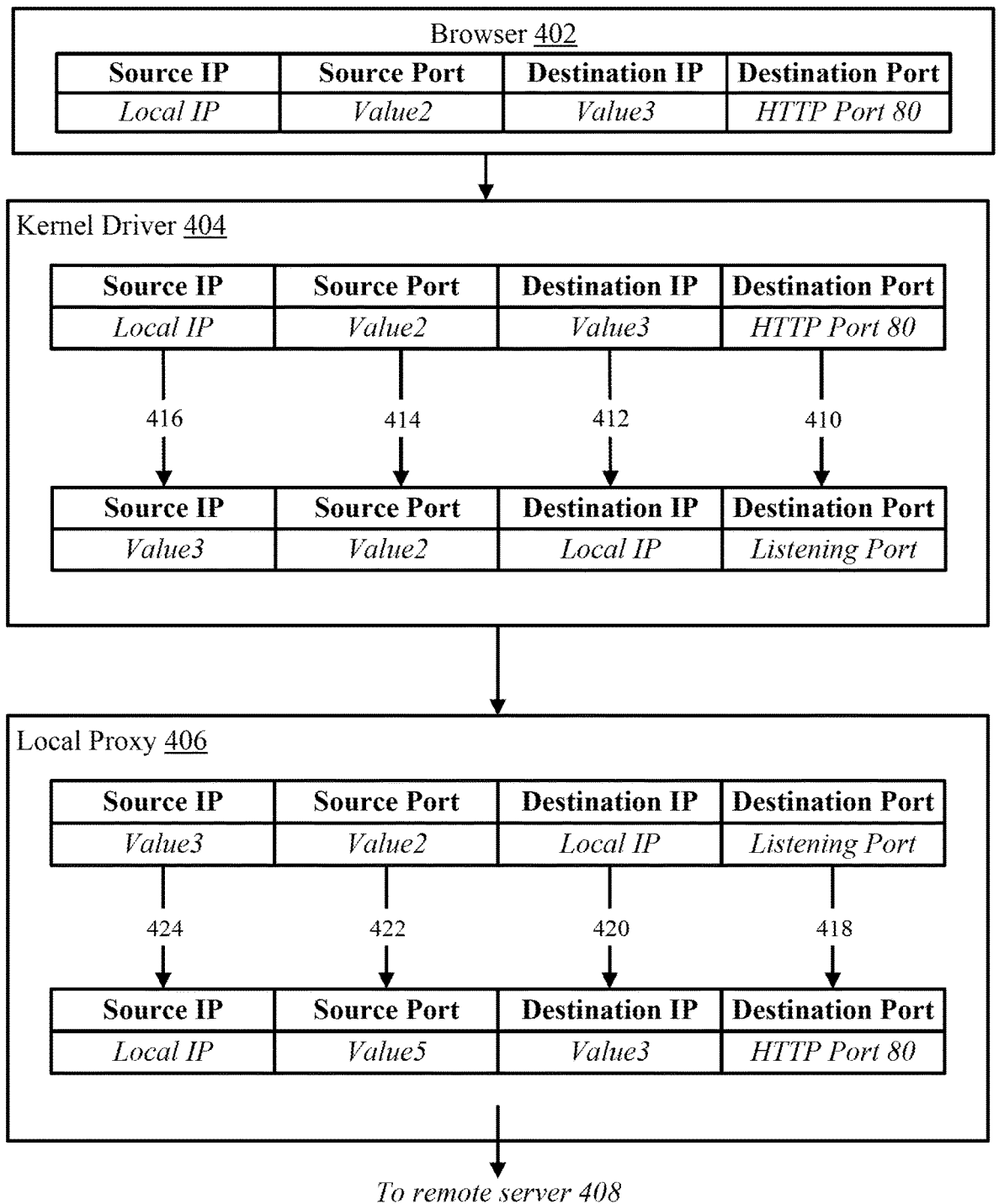
FIG. 4 illustrates a graphic of features and/or functions associated with managing networked communication sessions, in accordance with various embodiments of the disclosure.

FIG. 4 illustrates a graphic of features and/or functions associated with managing networked communication sessions, in accordance with various embodiments of the disclosure. In particular, FIG. 4 represents an outbound communication from a client application, such as a browser 402, to an external entity, such as a remote server 408. The browser 402 may generate source information and content information, defining a packet of information to be communicated to the remove server 408. The session information may include one or a combination of a source IP parameter, a source port parameter, a destination IP parameter, or a destination port parameter. A set of parameter values may include one or a combination of a local IP address value (labeled "Local IP") for the source IP parameter, a local port value of the client application (labeled "Value2") for the source port parameter, an external entity IP address value (labeled "Value3") for the destination IP parameter, or an HTTP port value (labeled "HTTP Port 80") for the destination port parameter. The source information and content information may be communicated to a kernel driver 404 running in a kernel mode of a computing system.

The kernel driver 404 may be configured to manipulate/modify the values of the session parameters in order to redirect the packet a local proxy 406 running in a user mode of the computing system. For example, the kernel driver 404 may perform one of a combination of: replacing 410 the HTTP port value (labeled "HTTP Port 80") with a listening port value of the local proxy (labeled "Listening Port") so that the listening port value is the value of the destination port parameter; replacing 412 the external entity IP address value ("Value3") with the local IP address value ("Local IP") so that the local IP address value is the value of the destination IP parameter; replacing 416 the local IP address value ("Local IP") of the source IP parameter with the external entity IP address value ("Value3") so that the external entity IP address value is the value of the source IP parameter; or maintaining 414 the local port value of the client application ("Value 2") for the source port parameter. The content information and the modified session parameter values may then be communicated to the local proxy 406. This may enable the system to avoid buffering/multiplexing/demultiplexing and to provide a faster, more efficient, connection between a client application and an external entity, and achieve less overhead (e.g., more efficiency) for the local proxy to process packet content.

The local proxy 406 may then again manipulate/modify the values of the session parameters in order to redirect the packet to the remote server 408. Through the manipulations by the kernel driver 404 and the local proxy 406, a direct channel between the remote server 408 and the browser 402 may be created without the need for multiplexing.

The local proxy 406 may perform one or a combination of: replacing 418 the listening port value ("Listening Port") of the destination port parameter with the HTTP port value ("HTTP Port 80") so that the HTTP port value is the value of the destination port parameter; replacing 420 the local IP address value ("Local IP") of the destination IP parameter with the external entity IP address value ("Value3") so that the external entity IP address value is the value of the destination IP parameter; replacing 422 the local port value of the client application ("Value2") of the source port parameter with a local proxy external session client socket port value ("Value5") so that the local proxy external session client socket port value is the value of the source port parameter; or replacing 424 the external entity IP address value ("Value3") of the source IP parameter with the local IP address value ("Local IP") so that the local IP address value is the value of the source IP parameter. The packet may then be communicated to the remote server 408.

Figure 5:
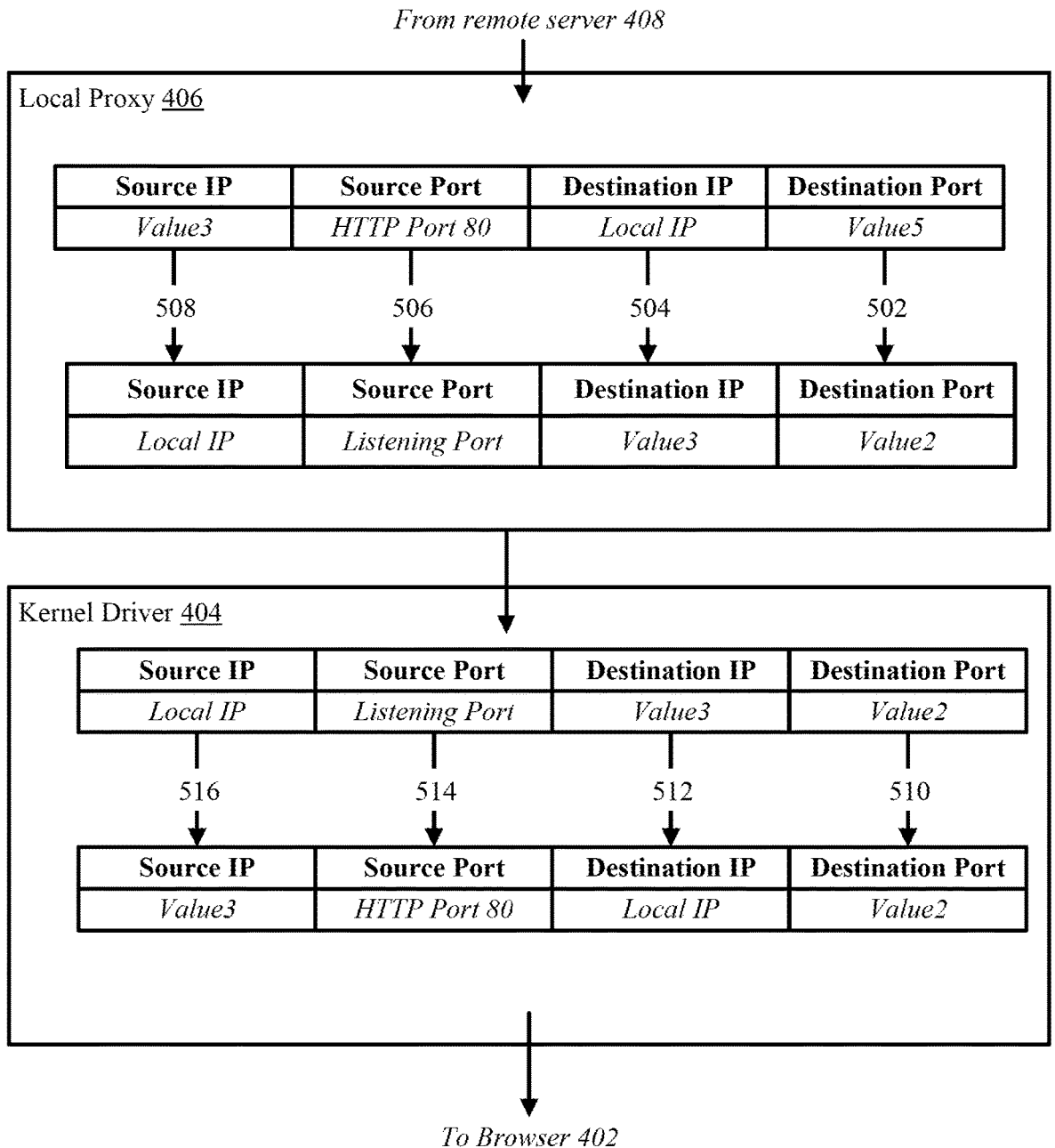
FIG. 5 illustrates a graphic of features and/or functions associated with managing networked communication sessions, in accordance with various embodiments of the disclosure.

FIG. 5 illustrates a graphic of features and/or functions associated with managing networked communication sessions, in accordance with various embodiments of the disclosure. In particular, FIG. 5 represents an inbound communication from the remote server 408 to the browser 402. The remote server 408 may generate and send a packet to the local proxy 406. The packet may include session information and content information. The session information may include one or a combination of: the external entity IP address value ("Value3") for the source IP parameter, the HTTP port value ("HTTP Port 80") for the source port parameter, the local IP address value ("Local IP") for the destination IP parameter, or the local proxy external session client socket port value for the destination port parameter. The session information and content information may be receive at the local proxy 406.

The local proxy 406 may be configured to manipulate/modify the values of the session parameters in order to redirect the packet to the kernel driver 404. The local proxy 406 may perform one or more of the following: replacing 502 the local proxy external session client socket port value ("Value5") with the local port value of the client application ("Value2") so that the local port value of the client application is the value of the destination port parameter; replacing 504 the local IP address value ("Local IP") with the external entity IP address value ("Value3") so that the external entity IP address value is the value of the destination IP parameter; replacing 506 the HTTP port value ("HTTP Port 80") with the listening port value ("Listening Port") of the local proxy so that the listening port value is the value of the source port parameter; or replacing 508 the external entity IP address value ("Value3") of the source IP parameter with the local IP address value ("Local IP") so that the local IP address value is the value of the source IP parameter. The packet may then be communicated to the kernel driver 404.

The kernel driver 404 may again manipulate/modify the values of the session parameters in order to redirect the packet to the browser 402. Through the manipulations by the kernel driver 404 and the local proxy 406, a direct channel between the remote server 408 and the browser 402 may be created without the need for multiplexing.

The kernel driver 404 may perform one or a combination of: replacing 512 the external entity IP address value ("Value3") of the destination IP parameter with the local IP address value ("Local IP") so that the local IP address value is the value of the destination IP parameter; replacing 514 the listening port value ("Listening Port") of the source port parameter with the HTTP port value ("HTTP Port 80") so that the HTTP port value is the value of the source port parameter; replacing 516 the local IP address value ("Local IP") of the source IP parameter with the external entity IP address value ("Value3") so that the external entity IP address value is the value of the source IP parameter, or maintaining 510 the local port value of the client application ("Value2") for the destination port parameter. The packet may then be directed to the browser 402.

Figure 6:
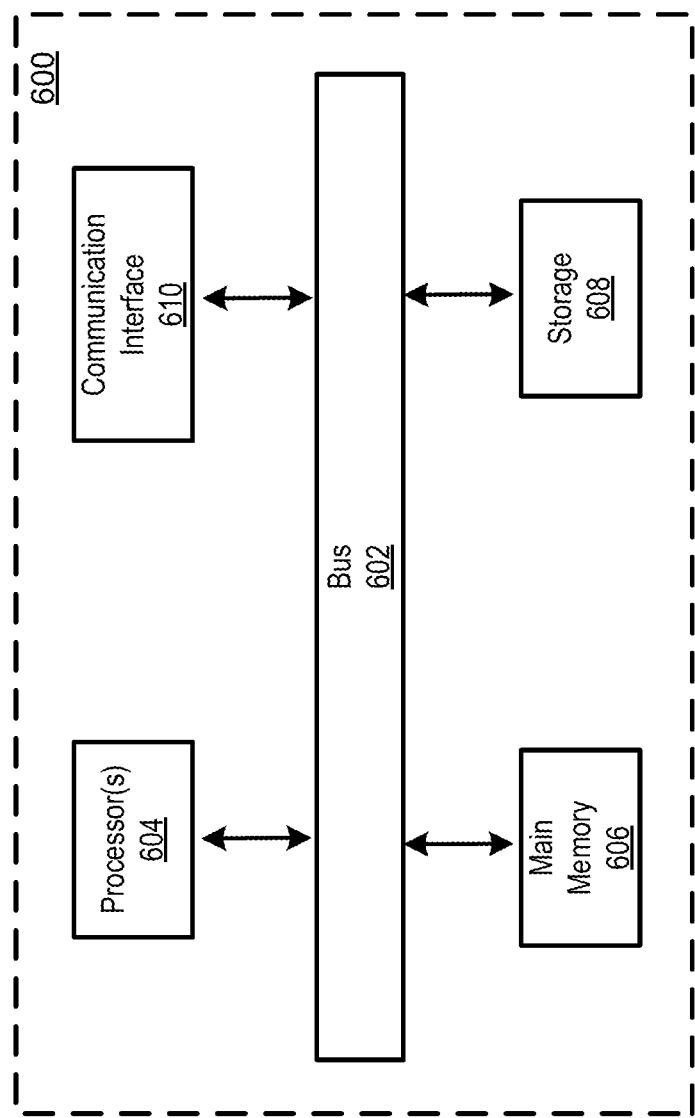
FIG. 6 illustrates a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor(s) 604. Main memory 606 also may be used for storing temporary variables or other intermediate information during execution of instructions to be executed by processor(s) 604. Such instructions, when stored in storage media accessible to processor(s) 604, render computer system 600 into a special-purpose machine that is customized to perform the operations specified in the instructions. Main memory 606 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, and networked versions of the same.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 608. Execution of the sequences of instructions contained in main memory 606 causes processor(s) 604 to perform the process steps described herein. For example, the process/method shown in FIG. 2 and/or FIG. 3 and described in connection with this figure can be implemented by computer program instructions stored in main memory 606. When these instructions are executed by processor(s) 604, they may perform the steps as shown in FIG. 2 and/or FIG. 3 and described above. In alternative embodiments, hard-wired circuitry may be used in place of or in combination with software instructions.

The computer system 600 also includes a communication interface 610 coupled to bus 602. Communication interface 610 provides a two-way data communication coupling to one or more network links that are connected to one or more networks. As another example, communication interface 610 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Certain embodiments are described herein as including logic or a number of components. Components may constitute either software components (e.g., code embodied on a machine-readable medium) or hardware components (e.g., a tangible unit capable of performing certain operations which may be configured or arranged in a certain physical manner). As used herein, for convenience, components of the computing system 102 may be described as performing or configured for performing an operation, when the components may comprise instructions which may program or configure the computing system 102 to perform the operation.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A system for managing networked communication sessions, the system comprising:
one or more processors; and
a memory storing instructions that, when executed by the one or more processors, cause the system to perform:
obtaining, by a driver running in a first operating mode of the one or more processors, information from a client application to be communicated to an external entity over a network, the information including session information and content information, the content information defining content of the communication between the client application and the external entity, the session information including a set of parameter values of a set of session parameters, the set of parameter values including a local IP address value set as a source IP parameter and an external entity IP address value set as a destination IP parameter;
redirecting, by the driver, the session information and the content information to a local proxy running in a second operating mode of the one or more processors via a local listening port of the local proxy, the redirecting comprising modifying the session information to generate modified session information, the modifying the session information comprising resetting the source IP parameter to be the external entity IP address value;

obtaining, at the local proxy, the modified session information and the content information; and establishing a communication channel between the local proxy and the external entity by modifying the modified session information to communicate the content information to the external entity.

2. The system of claim 1, wherein the set of session parameters further include a source port parameter and a destination port parameter, and the set of parameter values include:

a local port value of the client application set as the source port parameter,
and
an HTTP port value set as the destination port parameter.

3. The system of claim 2, wherein modifying the session information to generate the modified session information comprises:

replacing the external entity IP address value of the destination IP parameter with the local IP address value so that the local IP address value is the value of the destination IP parameter within the modified session information;

replacing the HTTP port value of the destination port parameter with a listening port value of the local proxy so that the listening port value is the value of the destination port parameter within the modified session information;
and
maintaining the local port value of the client application for the source port parameter within the modified session information.

4. The system of claim 1, wherein redirecting the session information and the content information to the local listening port of the local proxy comprises communicating, via the local listening port of the local proxy, the modified session information and the content information from the driver to the local proxy.

5. The system of claim 3, wherein modifying, at the local proxy, the modified session information generates external session information, and the modifying comprises:

replacing the listening port value of the destination port parameter within the modified session information with the HTTP port value so that the HTTP port value is the value of the destination port parameter within the external session information;

replacing the local IP address value of the destination IP parameter within the modified session information with the external entity IP address value so that the external entity IP address value is the value of the destination IP parameter within the external session information;

replacing the local port value of the client application of the source port parameter within the modified session information with a local proxy external session client socket port value so that the local proxy external session client socket port value is the value of the source port parameter within the external session information; and replacing the external entity IP address value of the source IP parameter within the modified session information with the local IP address value so that the local IP address value is the value of the source IP parameter within the external session information.

6. The system of claim 5, wherein the communication channel between the local proxy and the external entity is established via the external session information.

7. A method for managing networked communication sessions, the method comprising:

obtaining, by a driver running in a first operating mode of the one or more processors, information from a client application to be communicated to an external entity over a network, the information including session information and content information, the content information defining content of the communication between the client application and the external entity, the session information including a set of parameter values of a set of session parameters, the set of parameter values including a local IP address value set as a source IP parameter and an external entity IP address value set as a destination IP parameter;

redirecting, by the driver, the session information and the content information to a local proxy running in a second operating mode of the one or more processors via a local listening port of the local proxy, the redirecting comprising modifying the session information to generate modified session information, the modifying the session information comprising resetting the source IP parameter to be the external entity IP address value;

obtaining, at the local proxy, the modified session information and the content information; and establishing a communication channel between the local proxy and the external entity by modifying the modified session information to communicate the content information to the external entity.

8. The method of claim 7, wherein the set of session parameters further include a source port parameter and a destination port parameter, and the set of parameter values include:

a local port value of the client application set as the source port parameter,
and
an HTTP port value set as the destination port parameter.

9. The method of claim 8, wherein modifying the session information to generate the modified session information comprises:

replacing the external entity IP address value of the destination IP parameter with the local IP address value so that the local IP address value is the value of the destination IP parameter within the modified session information;

replacing the HTTP port value of the destination port parameter with a listening port value of the local proxy so that the listening port value is the value of the destination port parameter within the modified session information;
and
maintaining the local port value of the client application for the source port parameter within the modified session information.

10. The method of claim 7, wherein redirecting the session information and the content information to the local listening port of the local proxy comprises communicating, via the local listening port of the local proxy, the modified session information and the content information from the driver to the local proxy.

11. The method of claim 9, wherein modifying, at the local proxy, the modified session information generates external session information, and the modifying comprises:

replacing the local listening port of the source IP parameter within the modified session information with the local IP address value so that the local IP address value is the value of the source IP parameter within the external session information;

replacing the local IP address value of the destination IP parameter within the modified session information with the external entity IP address value so that the external entity IP address value is the value of the destination IP parameter within the external session information;

replacing the local port value of the client application of the source port parameter within the modified session information with a local proxy external session client socket port value so that the local proxy external session client socket port value is the value of the source port parameter within the external session information; and replacing the listening port value of the destination port parameter within the modified session information with the HTTP port value so that the HTTP port value is the value of the destination port parameter within the external session information.

12. The method of claim 11, wherein the communication channel between the local proxy and the external entity is established via the external session information.

* * * * *